United States Patent [19]
Noyes

[11] 3,929,566
[45] Dec. 30, 1975

[54] VOLUME DISPLACING MODULES FOR LIQUID METAL COOLED NUCLEAR REACTORS

[75] Inventor: Richard Croissant Noyes, Hartford, Conn.

[73] Assignee: Combustion Engineering, Inc., Windsor, Conn.

[22] Filed: June 25, 1973

[21] Appl. No.: 373,049

[52] U.S. Cl. .................................................. 176/37
[51] Int. Cl.: ........................................ G21c 13/08
[58] Field of Search ............. 176/37, 38, 87, DIG. 2

[56] References Cited
UNITED STATES PATENTS

| | | | |
|---|---|---|---|
| 3,021,273 | 2/1962 | Dix | 176/DIG. 2 |
| 3,072,549 | 1/1963 | Koutz | 176/DIG. 2 |
| 3,258,403 | 6/1966 | Malay | 176/DIG. 2 |
| 3,776,814 | 12/1973 | Hockett | 176/87 |

Primary Examiner—Robert F. Stahl
Attorney, Agent, or Firm—John R. Nelson

[57] ABSTRACT

A plurality of volume displacing modules removably positioned in the peripheral space between a liquid metal cooled reactor vessel and the walls of the containment structure forming a vessel cavity in which the vessel is disposed to insure that the level of coolant in the reactor vessel remains above a predetermined elevation in the event of coolant leakage into the vessel cavity. The reactor vessel is provided with an excess volume of liquid metal coolant. The total volume of the modules positioned in the peripheral space below the predetermined elevation is such that the coolant containing volume in the peripheral space with the modules in place is less than the volume of excess liquid metal coolant in the reactor.

9 Claims, 4 Drawing Figures

VOLUME DISPLACING MODULES FOR LIQUID METAL COOLED NUCLEAR REACTORS

BACKGROUND OF THE INVENTION

The present invention relates to liquid metal cooled reactors and more particularly to volume displacing modules removably placed in the peripheral space between the vessel and the walls of the containing structure in which the vessel is disposed.

With the safety of operation of nuclear reactors being of utmost concern today, it is imperative that the reactor be designed so that the probability of accidents occurring be reduced to very near the vanishing point. As a corallary to this, in the rare event of an accident, the reactor must be designed to safely halt the nuclear chain reaction and to minimize the severity of the attendant consequences of the accident. One of the accident situations which must be considered in the design is nuclear reactors is the loss of coolant accident, in which it postulated that a breach or a leak occurs in the reactor vessel or its associated piping. Safety considerations dictate that in the event of such an accident, adequate cooling of the core must be maintained. This is of concern since the absence of adequate cooling of the nuclear core may result in fuel failure and/or a core melt down with the consequent release of radioactive fission products to the outside atmosphere, or irreparable damage to the reactor.

In the event of a loss of coolant accident in a liquid metal cooled nuclear reactor, the safety requirements of maintaining adequate cooling of the core have been interpreted to require that the coolant level in the vessel never fall below the level of the core. Circulation of the coolant to the nuclear core to remove the heat generated by the radioactive fission products may then be accomplished by natural convection and/or conventional conduit systems. Generally, this requirement has been met by providing an excess of liquid metal coolant over that which is needed to cover the core, and providing an outside containment boundary to accumulate any leakage of coolant. By proper sizing of the containment boundary and of the vessel to hold the excess coolant, the drop in coolant level can be controlled so that the core is always covered by coolant. Of necessity, this had led to large oversized vessels and/or close fitting containment boundaries.

In particular, in an effort to limit the required reactor vessel size, close fitting guard vessels have heretofore been used which surround the reactor vessel to form the coolant containment boundary. Such vessels are closely spaced from and completely surround the vessel and associated piping such that the interior volume between the reactor vessel and the guard vessle is less than the volume of the excess liquid metal coolant within the reactor vessel.

There are, however, problems which exist with the use of a close fitting guard vessel. First there is a problem of installing a reactor vessel in the guard vessel since the guard vessel must be of an elaborate shape to enclose both the vessel and the coolant conducting piping. This nessitates that the guard vessel be formed in a piecemeal fashion, and then constructed around the already formed reactor vessel.

Secondly, there is limited access to make repairs to the reactor vessel if a breach occurs which otherwise could be repaired. Such a repair would necessitate cutting a guard vessel first and then repairing the guard vessel after the reactor vessel has been repaired.

SUMMARY OF THE INVENTION

The present invention overcomes the above discussed and other disadvantages of the prior art by providing a novel arrangement for insuring that the liquid metal coolant level will not fall below the level of the core in the event of a loss of coolant accident. There is provided in combination, a liquid metal cooled reactor vessel, a containment structure forming a vessel cavity in which said vessel is vertically disposed, and a plurality of volume displacing modules placed in the peripheral space between the walls of the containment structure and the reactor vessel. The reactor vessel has a nuclear core, a plurality of nozzles mounted thereon and communicating with the interior thereof, and conduit means coupled to the nozzles for communicating coolant onto and out of the reactor vessel to cool the nuclear core. Also the vessel has a coolant containing chamber or plenum in the interior thereof with a portion of this chamber above a predetermined elevation above the nuclear core being of a first coolant containing volume. The peripheral space between the containment structure and the reactor vessel defines, below the predetermined elevation a second volume. The volume displacing modules, which are removably positioned in the peripheral space, have a total volume such that the second volume minus the total volume of all of the modules is less than the first coolant containing volume. This insures that the level of coolant in said vessel will remain above the predetermined elevation in the event of a coolant leakage into the vessel cavity.

With this arrangement, the reactor vessel, in being installed in the reactor cavity, is first positioned in the cavity and all the necessary preparations for insuring that the vessel and associated piping are coolant tight are made. Then the volume displacing modules are placed in the peripheral space. During operation of the reactor, if a leak or breach should occur, the elevation of the liquid metal coolant within the reactor will be maintained above the predetermined elevation, which is at least above the nuclear core. If any inspection or repairs on the reactor vessel or its associated piping are necessary, then the modules may be easily removed from the cavity to allow access to perform the inspection and/or repair work.

DESCRIPTION OF THE PREFERRED EMBODIMENT

Figure 1:
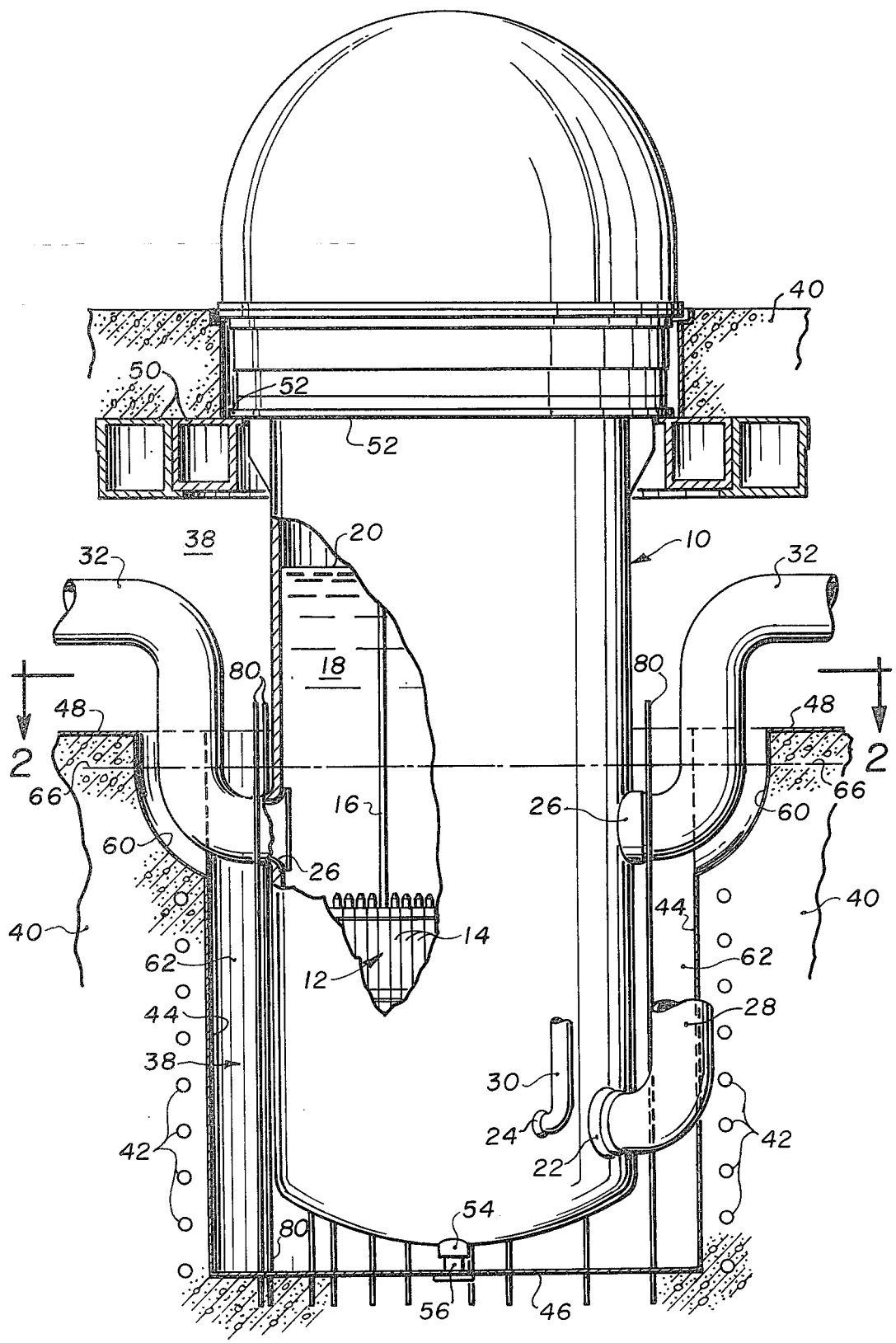
FIG. 1 is a side elevational view of a liquid metal cooled nuclear reactor disposed in a vessel cavity, the volume displacing modules of the present invention being deleted for clarity.

Referring now to the drawings, FIG. 1 illustrates a liquid metal cooled reactor vessel 10 housing a nuclear core 12 which comprises a plurality of fuel assemblies 14. The core 12 may be supported in any well-known manner, knowledge of the specific method of support not being relevant to a thorough understanding of the present invention. A plurality of control elements 16, one of which is shown in FIG. 1, extends downward from above through the upper vessel chamber or plenum 18 into the nuclear core 12 to control the nuclear reaction therein. The upper plenum 18 is located within the reactor vessel 10 above the nuclear core 12 and during normal operation is filled with a liquid coolant, such as liquid sodium, which has passed upward through the nuclear core 12. The normal elevation of the sodium in the vessel 10 is indicated by elevation line 20. The reactor vessel 10 is also provided with a plurality of inlet and outlet openings or nozzles 22, 24 and 26 in the sidewalls thereof. Associated piping or conduits 28, 30 and 32 are coupled to these openings to conduct the sodium through the reactor vessel 10. For the reactor vessel 10 shown in the drawings, the high pressure coolant inlet conduit 28 introduces a high pressure coolant fluid into a lower distribution chamber (not shown). The low pressure inlet conduit 30 injects a low pressure coolant fluid into a low pressure plenum (not shown) which will then act in conjunction with the high pressure coolant fluid to hydraulically hold down the fuel assemblies 14. The coolant fluid then passes upward through the nuclear core 12 to remove the heat generated therein, into the upper plenum 18, and out through the outlet opening 26 into the outlet conduit 32 where it is then conducted to a heat exchanger (not shown). Such an arrangement for conducting coolant through a reactor vessel 10 and holding the fuel assemblies 14 in place is well known and forms no part of the present invention. Of course, it should be noted that the internal reactor hardware depicted in FIG. 1 is merely illustrative and by no means is intended to be totally exhaustive of what may be included in a typical liquid metal cooled nuclear reactor. As can be seen in the FIG. 2 auxiliary inlet and outlet conduits 34 and 36 are coupled to the reactor vessel 10 and are in fluid communication with the interior thereof to provide an auxiliary or emergency flow circulating loop. The purpose of this auxiliary flow circulating loop will be described hereinbelow.

As shown in FIG. 1 the reactor vessel 10 is vertically disposed and supported in a reactor vessel cavity 38 defined by the containment structure 40. The containment structure 40 serves to shield and seal the reactor vessel from the outside atmosphere and is formed in reinforced, high temperature concrete in which is embedded a plurality of cooling coils 42. The cooling coils 42 are for the purpose of preventing dehydration of the concrete so that neutron irradiation does not appreciably impair the structural integrity and shielding properties of the concrete containment structure 40. The interior walls 44 and floor 46 of the containment structure 40 are made of steel which lines the concrete containment structure 40 to further protect the containment structure from adverse effects of nuclear irradiation.

The reactor vessel 10 is supported in the cavity by means of a series of ring girders 50 embedded in the upper elevation of the containment structure 40. The ring girders 50 engage a flanged lip 52 on the outside of the reactor vessel 10 to support the entire weight of the reactor vessel 10 and its internals. The vessel 10 is properly aligned within the cavity 38 by means of a locating plug 56 embedded in the floor 46 of the containment structure 40 and a locating ring 54 attached to the bottom of the reactor vessel 10. This method of support and locating the reactor vessel within a cavity is merely illustrative of typical and well-known supporting methods and forms no part of the present invention. Inlet and outlet pipe recesses 58, 60 are provided in the sidewalls of the containment structure 40 to accommodate the inlet and outlet conduits 28, 32 attached to the reactor vessel 10. As can be appreciated, the necessity of these recesses 58, 60 depends upon the size of the reactor vessel cavity 38 relative to the size of reactor vessel 10. If a larger area is desired in the peripheral space 62 between the reactor vessel 10 and the walls 44 of the containment structure 40, then these pipe recesses 58 and 60 may not be necessary. As with the rest of the interior walls of the containment structure 40, the interior of the recesses 58, 60 are also steel lined.

In the event of a loss of coolant accident as previously described, it is necessary to insure that the liquid metal coolant level, in this case the liquid sodium level, will not fall below the upper elevation of the nuclear core 12. Also it is desirable to insure that the liquid sodium coolant can be circulated through the nuclear core 12 to remove the decay heat generated therein in the event of a loss of coolant accident. In this preferred embodiment, line 66 represents the predetermined minimum sodium elevation which has been chosen to insure that the liquid sodium level does not fall below the core elevation and that the liquid sodium can be circulated through the core via either the primary inlet and outlet conduits 20 and 24 or the auxiliary conduits 34 and 36. As can be seen, this elevation 66 is above the elevation of the outlet nozzles or opening 26, the uppermost opening in the reactor vessel 10. As is apparent then, the volume of coolant in the upper plenum 18 between the normal sodium elevation 20 and the minimum sodium elevation 66 must be greater than the volume which is available to be occupied by coolant in a peripheral space 62 below the predetermined minimum sodium elevation 66.

In order to accomplish this task and still maintain an adequate work area in the peripheral space 62 between the walls 44 of the containment structure 40 and the exterior of the reactor vessel 10, the present invention proposes the use of a plurality of volume displacing modules 70 to be removably disposed and stacked in the peripheral space 62. The volume displacing modules 70 are of such a volume that the coolant containing volume in the peripheral space 62 below the minimum sodium elevation 66 with the modules 70 positioned therein is less than the volume of liquid sodium in the vessel 10 between the normal elevation 20 and the predetermined minimum elevation 66.

Figure 2:
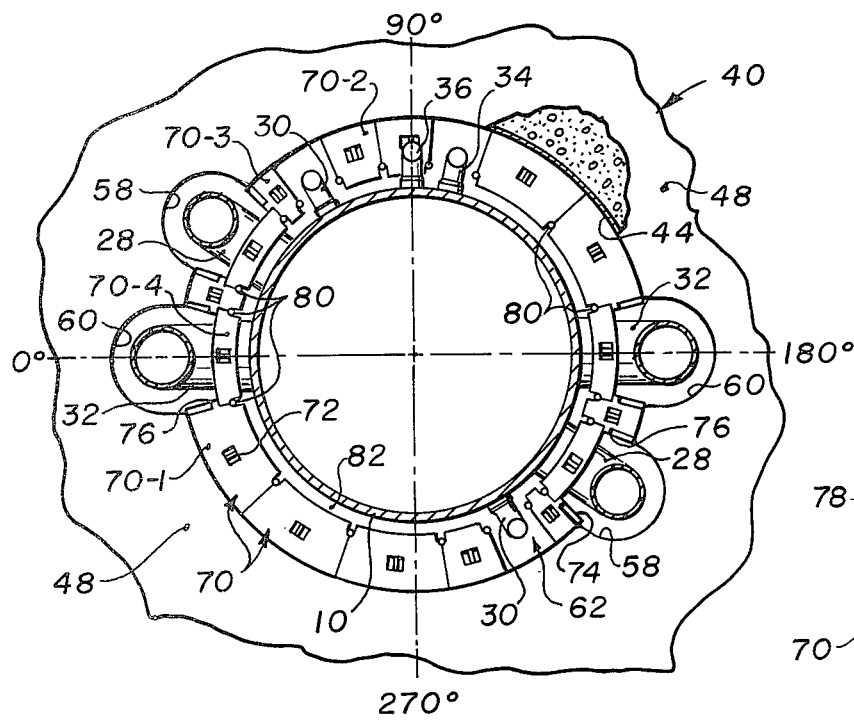
FIG. 2 is a plan view taken along lines 2—2 of FIG. 1 with the internals of the reactor vessel being deleted for clarity.
Figure 3:
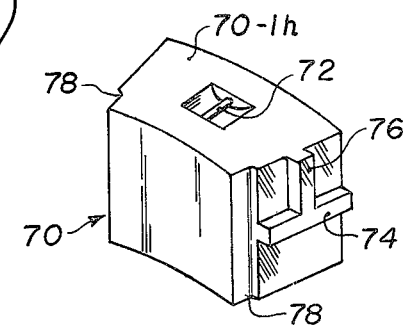
FIG. 3 is a perspective view of a typical volume displacement module.
Figure 4:
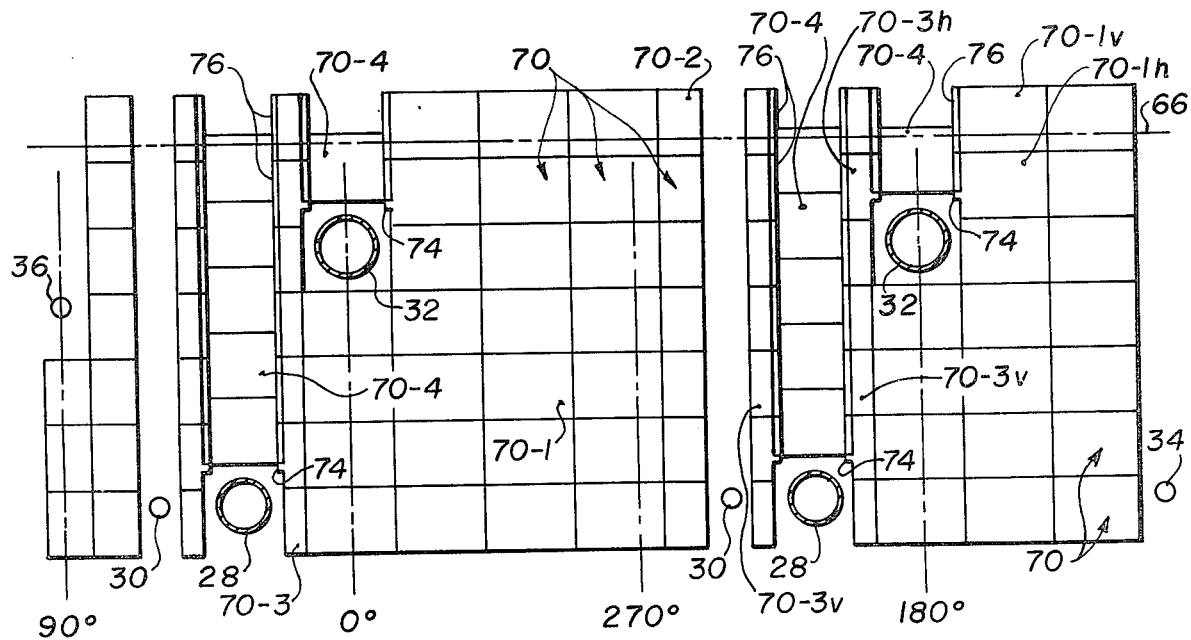
FIG. 4 is a schematic diagram of the development of the volume displacing modules as they are placed in the peripheral space between the reactor vessel and the containment structure.

As shown in FIGS. 2, 3 and 4, the volume displacing modules 70 are each curved bodies of the same general segmented annular shape. Of course, the specific dimensions and number of different size modules is dependent upon the size of the reactor vessel 10, the size of containment structure 40 and the volume which is to be displaced by the modules 70. In the embodiment shown in the figures there are four different basic sized modules 70-1, 70-2, 70-3, 70-4 each of which is of the same height. The three modules 70-1, 70-2, 70-3, each are of the same radial width and vary from one another only in their circumferential length. The module 70-4 is of the same circumferential length as the module 70-1, but is of a narrower radial width.

The modules 70 are all placed in the peripheral space 62 between the exterior of the reactor vessel 10 and the interior walls 44 of the containment structure 40. The specific pattern of placement, in other words both the radial location and the elevational location of the modules 70, can be seen in FIGS. 2 and 4. FIG. 4 is a schematic diagram of the module development pattern viewed as if the circumferentially arranged modules 70 had been "wrapped" from around the reactor vessel 10, the view being taken looking from outside the containment structure 40 toward the center of the reactor vessel 10. The modules 70 are held thereinplace by means of vertically disposed guide rails 80 spaced about the reactor vessel 10 in the peripheral space 62. The guide rails 80 are removably supported in the floor 46 of the containment structure 40. Each of the modules 70 has two recesses 78 in two of the corner edges thereof to provide shoulders for engagement with the guide rails 80. Accordingly, the guide rails 80 act to prevent the modules 70 from falling in on the reactor vessel 10 or from falling onto the conduits or pipes 28, 30, 32, 34 and 36 attached to the reactor vessel 10.

In the preferred embodiment, some of the modules 70 are provided with integral horizontal ledges 74 and/or vertical flanges 76. The ledges 74 are for the purpose of supporting circumferentially adjacent modules (in particular, modules 70-4), in the peripheral space above the liquid sodium inlet and outlet conduits 28, 32. The vertical flanges 76 are for the purpose of preventing circumferentially adjacent modules (in particular, modules 70-4) from falling back onto the liquid sodium inlet and outlet conduits 28, 32. It should be noted that the modules 70 having horizontal ledges 74 also have vertical flanges 76. The modules 70 which have flanges 76 are indicated by a $v$ following its referenced numeral and the modules 70 which have horizontal ledges 74 and vertical flanges 76 are indicated by an $h$. As can be appreciated, the use of the horizontal ledges 74 is not the only method of supporting the modules 70-4 above liquid sodium conduits 28, 32. One possible alternative may be to stagger the modules 70 as they are placed in the peripheral space 62, such as is done, for example, in laying bricks, so that the modules 70 placed above one of the liquid sodium conduits 28, 32 would span the space between the modules 70 directly therebelow.

As can be seen from FIGS. 2 and 4, some of the liquid sodium conduits, in particular the two low pressure conduits 30 and the auxiliary conduits 34, 36 are not surrounded by volume displacing modules 70. This is due to the fact that the volume displaced by the volume displacement modules 70 below the minimum sodium elevation 66 is greater than the volume of coolant in the plenum 30 between the normal sodium elevation 18 and the minimum sodium elevation 66. Accordingly, no further volume displacement is required in the peripheral space 62. It should also be noted in connection with this that in the embodiment shown no volume displacing modules 70 are placed beneath the reactor vessel 10. However, if additional volume displacement is required, then either permanent, semi-permanent or removable volume displacing filler could be included beneath the reactor vessel 10 depending on what is desired.

As hereinabove indicated, it is highly desirable to maintain adequate work space around the vessel 10 so that the vessel can be inspected periodically and, if necessary, easily repaired. The volume displacing modules 70 have been designed so that they may be easily removed from the peripheral space 62. Each of the modules 70 has a handling lug 72 recessed in its upper surface which is engagable by a crane (not shown) so that the modules 70 can be lifted out of the cavity 38. For removing the modules 70 positioned beneath the liquid sodium conduits 32, 36 from the peripheral space 62, all that is necessary is to remove the guide rails 80 from their supports in the floor 46 of the containment structure 40 and slide the modules 70, either one at a time, or the entire stack, out from underneath the conduits 32, 36. An upper storage ledge 50 above the minimum sodium elevation 66 has been provided by the containment structure 40 to provide space for temporary storage of the modules 70. In this way the modules can be stored out of the way while inspection and repair work is performed. In the embodiment shown in the figures, two types of inspection have been contemplated: an initial survey inspection and a detailed inspection. For the survey inspection, a small gap 82 of the order of 6 inches has been left between the modules 70 and the reactor vessel 10 to permit an inspection device to be inserted therebetween to determine if a more detailed inspection or repair is necessary on the vessel 10. If such is the case, then the modules 70 may be selectively removed and the detailed inspection and/or repair performed.

Only two major requirements need be imposed on the material used for the volume displacing modules 70. First, the module material must be compatible with the liquid metal coolant, i.e., it must be inert and not react in an adverse manner when contacted by the liquid metal coolant. Secondly, the modules must remain solid at all temperatures at which the liquid metal coolant may be released into the reactor cavity 38. This insures that the volume displacement qualities on the modules will not be lost and only liquid metal coolant will circulate through the reactor vessel 10. In a typical sodium cooled reactor, the maximum release temperature contemplated is of the order of 1200°F. Accordingly, in the preferred embodiment the modules 70 are graphite block with a stainless steel cover or can there surrounding. With a stainless steel covering any necessary ledges 74 or flanges 76 may be easily welded to the module 70. Alternatives for the module material might include graphite without a stainless steel cover, cast iron blocks, or almost any ceramic or metal which would satisfy the above two mentioned requirements. The major obstacle with the use of metals, however, is cost. Another advantage of the use of graphite for the modules is that graphite is an effective neutron shield and, accordingly, acts to shield the concrete containment structure 40 from the adverse effects of neutron irradiation. This aids in preserving the structural integrity of the containment structure 40.

In the event of a loss of coolant accident due to a rupture in one of the conduits in the reactor vessel cavity 38, or in the reactor vessel 10, the liquid sodium elevation inside the reactor vessel 10 will fall till it essentially equalizes with the sodium elevation in the cavity 38. The volume displacing modules 70 in the peripheral space 62 surrounding the reactor vessel 10 have been designed so that the coolant containing volume remaining in the peripheral space 62 is less than the excess volume of sodium in the reactor vessel 10 above a predetermined desired minimum elevation. In the embodiment shown in the figures the predetermined desired minimum elevation, denoted by line 62, is above all of the coolant openings or nozzles 22, 24, 26 of the reactor vessel 10. The reason for having the minimum sodium elevation 66 above the coolant openings or nozzles 22, 24, 26 is to insure that the coolant (sodium) can be circulated through the core 12 to remove decay heat in the event of a loss of coolant accident, either by means of normal coolant conduits 28, 30, 32 or by means of the auxiliary conduits 34, 36. Of course, if the pressure drop across the core 12 at the emergency flow rate of the coolant is very great then an allowance will have to be made in determining the required elevation of coolant in the peripheral space 62 above that elevation of coolant inside the reactor vessel 10 to insure that the nozzle or coolant openings 22, 24, 26 will remain submerged in liquid sodium. Accordingly, the predetermined desired minimum sodium elevation 66 should be located a short distance above the nozzles. In the embodiment shown in the figures, this elevation is about 3 feet above the top of the uppermost openings 26. Additionally, circulation of the coolant through the core 12 will occur by means of natural convection. This natural convection is aided by the cooling coils 42 embedded in the containment structure 40 which will cause the liquid sodium in the peripheral space 62 to be cooler than the liquid sodium in the reactor vessel 10.

It will be understood that the embodiment shown and described herein is merely illustrative and that changes may be made without departing from the scope of the invention as claimed.

What is claimed is:

1. In combination;
a liquid metal cooled reactor vessel having a nuclear core therein, a plurality of nozzles mounted thereon and communicating with the interior thereof, a conduit means coupled with said nozzles for communicating liquid metal coolant into and out of said reactor vessel to cool said nuclear core, said vessel having a coolant containing plenum in the interior thereof, a portion of said plenum above a predetermined elevation above said nuclear core being of a first coolant containing volume;
a containment structure forming a vessel cavity in which said vessel is vertically disposed, said vessel being spaced from the walls of said containment structure to define a peripheral space the lateral dimension of which is sufficient to permit access by personnel into said space, and said peripheral space below said predetermined elevation defining a second volume; and
a plurality of volume displacing modules removably positioned in said peripheral space, the total volume of all of said modules positioned below said predetermined elevation being such that said second volume minus said total volume of all said modules is less than said first volume thereby insuring that level of coolant in said vessel will remain above said predetermined elevation in the event of coolant leakage into said cavity.

2. The combination of claim 1 wherein said modules are also of a material having the properties of being inert with respect to the liquid metal coolant, and remaining solid at all temperatures at which the liquid metal coolant may leak into said reactor vessel cavity.

3. The combination of claim 2 wherein the material of the said modules is graphite.

4. The combination of claim 3 wherein said graphite blocks have a stainless steel covering theresurrounding.

5. The combination of claim 2 wherein said plurality of volume displacing modules are circumferentially arranged and stacked in said peripheral space surrounding said nuclear reactor vessel.

6. A combination of claim 5 wherein each of said volume displacing modules are curved bodies having vertical side walls, said curved bodies having at least two recesses in said side walls to form vertically extending shoulders and wherein there are provided a plurality of vertically disposed guide rails spaced about the reactor vessel in said peripheral space, said guide rails being removably supported in the floor of said containment structure and engaging said shoulders formed by said recesses in said curved bodies to hold said modules in place in said peripheral space.

7. The combination of claim 6 wherein each of said volume displacing modules have a recessed handling lug in its upper surface for removing said modules from said reactor vessel cavity and wherein said containment structure has an upper storage ledge above said predetermined elevation to provide a temporary storage space for said modules which are removed from said cavity.

8. In combination;
a liquid metal cooled reactor vessel having a nuclear core therein, a plurality of nozzles mounted thereon and communicating with the interior thereof, and conduit means coupled to said nozzles for communicating liquid metal coolant into and out of said reactor vessel to cool said nuclear core, said vessel having a coolant containing plenum in the interior thereof, a portion of said plenum above a predetermined elevation above said nuclear core being of a first coolant containing volume;
a containment structure forming a vessel cavity in which said vessel is vertically disposed, said vessel being spaced from the walls in said containment structure to define a peripheral space the lateral dimension of which is sufficient to permit access by personnel into said space; and
a plurality of volume displacing modules placed in close fitting array in said peripheral space adjacent to said walls of said containment structure, said modules being removably positioned therein and being of a material which acts as a neutron shield so as to protect at least a portion of said walls of said containment structure from neutron irradiation, and the coolant containing volume of said peripheral space below said predetermined elevation with said volume displacing modules positioned therein being less than said first volume, thereby insuring that the level of coolant in said vessel will remain above said predetermined elevation in the event of a loss of coolant accident.

9. The combination of claim 1 wherein said modules are placed in a close fitting array with one another adjacent to said walls of said containment structure and wherein said modules are of a material which serves as a neutron shield to protect at least a portion of said walls of said containment structure from neutron irradiation.

* * * * *

UNITED STATES PATENT OFFICE
CERTIFICATE OF CORRECTION

PATENT NO. : 3,929,566
DATED : December 30, 1975
INVENTOR(S) : Richard Croissant Noyes It is certified that error appears in the above-identified patent and that said Letters Patent are hereby corrected as shown below:

Page 1 under United States Patents cited 3,776,814 12/1973 "Hockett" should be "Lockett"

Column 1, line 20 change "is nuclear" to --of nuclear--.

Column 1, line 21 after "it" insert --is--.

Column 1, line 55 change "vessle" to --vessel--.

Column 2, line 19 change "onto" to --into--.

Column 5, line 9 change "wrapped" to --unwrapped--.

Column 5, line 35 after "have" insert --vertical--.

Column 7, line 61 change "1" to --9---.

Signed and Sealed this

Twelfth Day of April 1977

[SEAL]

Attest:

RUTH C. MASON
Attesting Officer

C. MARSHALL DANN
Commissioner of Patents and Trademarks